United States Patent [19]

Williams

[11] Patent Number: 5,957,405

[45] Date of Patent: Sep. 28, 1999

[54] TWIN ENGINE AIRCRAFT

[75] Inventor: Samuel B. Williams, Bloomfield Hills, Mich.

[73] Assignee: Williams International Co., L.L.C., Walled Lake, Mich.

[21] Appl. No.: 08/897,771

[22] Filed: Jul. 21, 1997

[51] Int. Cl.⁶ .................................................. B64C 15/00
[52] U.S. Cl. .............................. 244/15; 244/54; 244/55; 244/53 B
[58] Field of Search .............................. 244/54, 55, 53 B

[56] References Cited

U.S. PATENT DOCUMENTS

| | | | |
|---|---|---|---|
| D. 191,019 | 8/1961 | Thieblot | D12/340 |
| D. 370,456 | 6/1996 | Buchsel et al. | D12/340 |
| 3,415,468 | 12/1968 | Labombarde | 244/87 |
| 4,500,055 | 2/1985 | Krojer | 244/55 |
| 5,114,097 | 5/1992 | Williams | 244/53 B |

*Primary Examiner*—Charles T. Jordan
*Assistant Examiner*—Charles R. Ducker, Jr.
*Attorney, Agent, or Firm*—Lyon, P.C.

[57] ABSTRACT

A jet aircraft has a generally conical front fuselage section, a cylindrical intermediate fuselage section defining a passenger compartment and a generally conical aft fuselage section having a maximum lateral dimension substantially smaller than the maximum lateral dimension of the intermediate fuselage section. The aircraft's propulsion engines are mounted on combination vertical and horizontal stabilizers in spaced relation to the conical aft fuselage section with the air inlets and exhaust nozzles thereof disposed entirely within a rearward projection of the lateral cross section of the intermediate fuselage section to preclude the ingestion of foreign objects thereinto and maximize efficiency of boundary layer air flow.

4 Claims, 3 Drawing Sheets

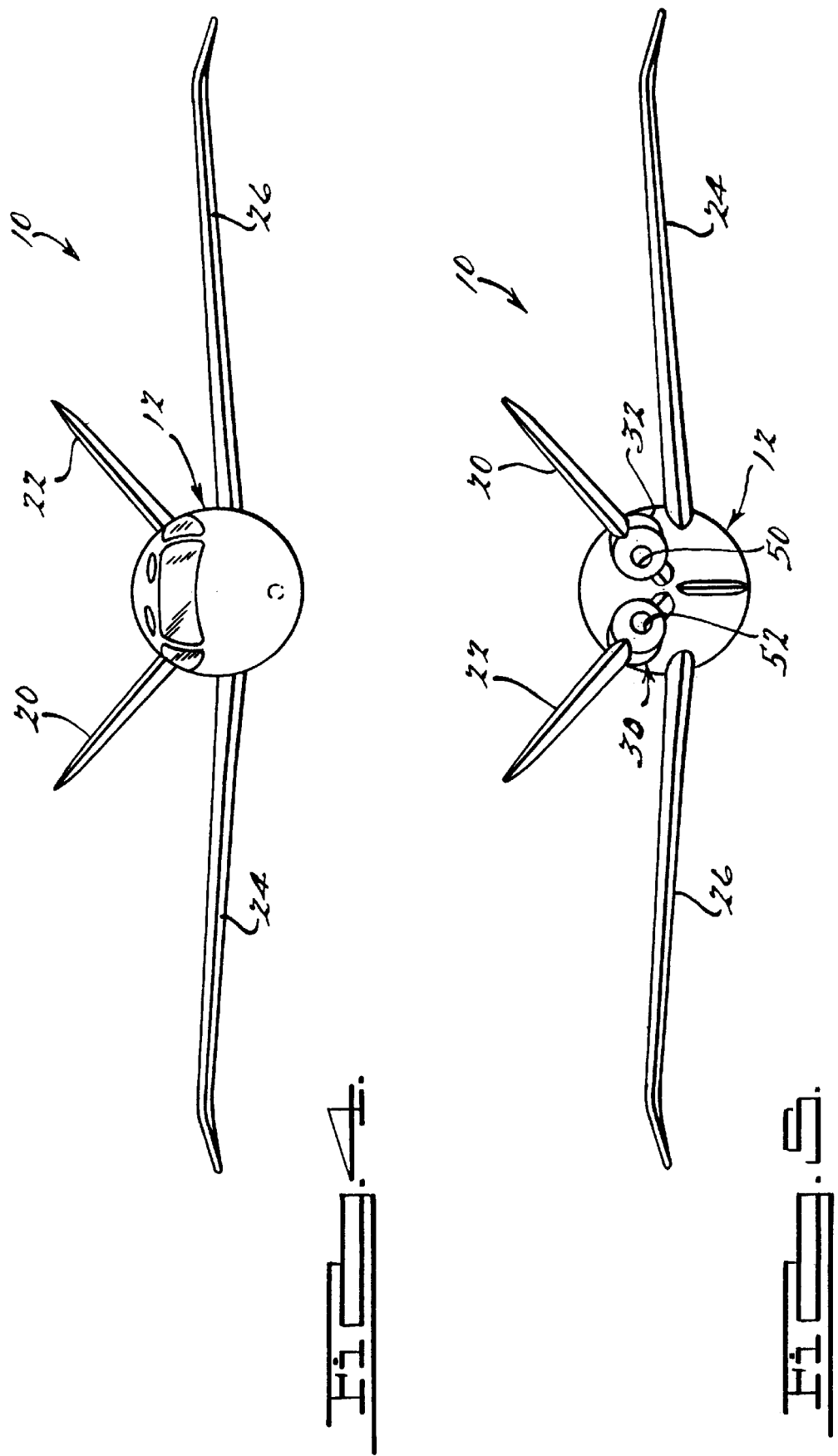

TWIN ENGINE AIRCRAFT

The present invention relates to an aircraft having an airframe configuration and engine orientation that precludes the ingestion of foreign objects, for example, birds, into the aircraft's engines yet exhibits efficient inlet air flow to the engines.

BACKGROUND OF THE INVENTION

Turbofan powered aircraft are required to cruise for considerable distance at high speed. Thus, propulsion system efficiency of the aircraft must be maximized. On the other hand, the propulsion system of the aircraft must be capable of ingesting foreign objects without engine damage. The problem of foreign object ingestion has been solved in the past by merely increasing the strength of the engine components exposed to impact damage. However, strength can be equated with weight, which, in turn, compromises performance of the aircraft. Reconciliation of such seemingly divergent performance and safety requirements requires careful integration of the aircraft's propulsion system with airframe aerodynamics.

The basic model of air flow past an aircraft fuselage assumes that air viscosity acts over a relatively thin region, namely the boundary layer. The boundary layer exists in several states, namely, laminar, turbulent, wake and the external stream. In the laminar state, flow is stratified. Farther aft, laminar flow is transformed into a turbulent state which is eddying in character. Turbulent flow is transformed into a wake wherein the direction of flow may actually reverse.

While both laminar and turbulent airflow along the fuselage of an aircraft tend to follow the contour of the fuselage, relatively heavy foreign objects, for example, birds, tend to flow rearwardly of the aircraft fuselage in the external stream due to inertial forces.

SUMMARY OF THE INVENTION

In accordance with the present invention, the engine nacelles and engine air inlets of the disclosed aircraft are positioned relative to the aft section or tail cone of the fuselage so that ingestion of foreign objects into the engine air inlets is precluded while air flow to the engines is maximized. While the fuselage configuration and engine orientation of the invention are designed primarily to solve the problem of heavy object ingestion, practice of the invention is effective in eliminating the ingestion of large raindrops which, in turn, protects the inlets from rapid ice accretion as well as eliminating the tendency of heavy rain to cause engine flameout. Moreover, the nacelle and inlet of each engine is cantilevered forwardly from each of the airfoil-shaped tail surfaces with clearance provided between the nacelle and fuselage tail cone to allow boundary layer air to flow through this space. Each nacelle encompasses both sides of each tail surface and extends rearwardly thereof, tapering at the rear to define an engine exhaust nozzle. Clearance between the engine nacelles and tail cone minimizes the impact of tail cone boundary layer air on engine inlet air.

Specifically, the jet aircraft of the present invention solves the problem of foreign object ingestion by (a) utilizing a conical aft fuselage or tail cone that, in a lateral plane containing the engine inlets, is significantly smaller in radial cross section than the maximum cross section of the main fuselage section, and (b) placing the engine air inlets radially inwardly of a rearward projection of the main fuselage section and of the rearward flowing external stream and well forwardly of the separation point between turbulent flow and the wake and preferably forwardly of the separation point between laminar and turbulent flow.

The invention has particular utility when applied to a V-tail configuration wherein the engines are mounted on the V-tail. Each engine air intake is disposed radially inwardly of the theoretical rearward projection of the maximum lateral cross section of the aircraft fuselage and forwardly of the separation point between turbulent boundary layer flow and wake flow. Placement of the engine air inlets radially inwardly of the rearwardly projected maximum lateral cross section of the fuselage precludes the entrance into the engine air inlets of foreign objects moving in the external stream. Placement of the engine air inlets forwardly of the separation point between laminar and/or turbulent flow adjacent the fuselage maximizes the induction of relatively dense ram air to the engines.

BRIEF DESCRIPTION OF THE DRAWINGS

FIG. 4. is a front view of the aircraft of FIG. 2.

FIG. 5. is a rear view of the aircraft of FIG. 2.

DETAILED DESCRIPTION OF THE PREFERRED EMBODIMENT(S)

Figure 1:
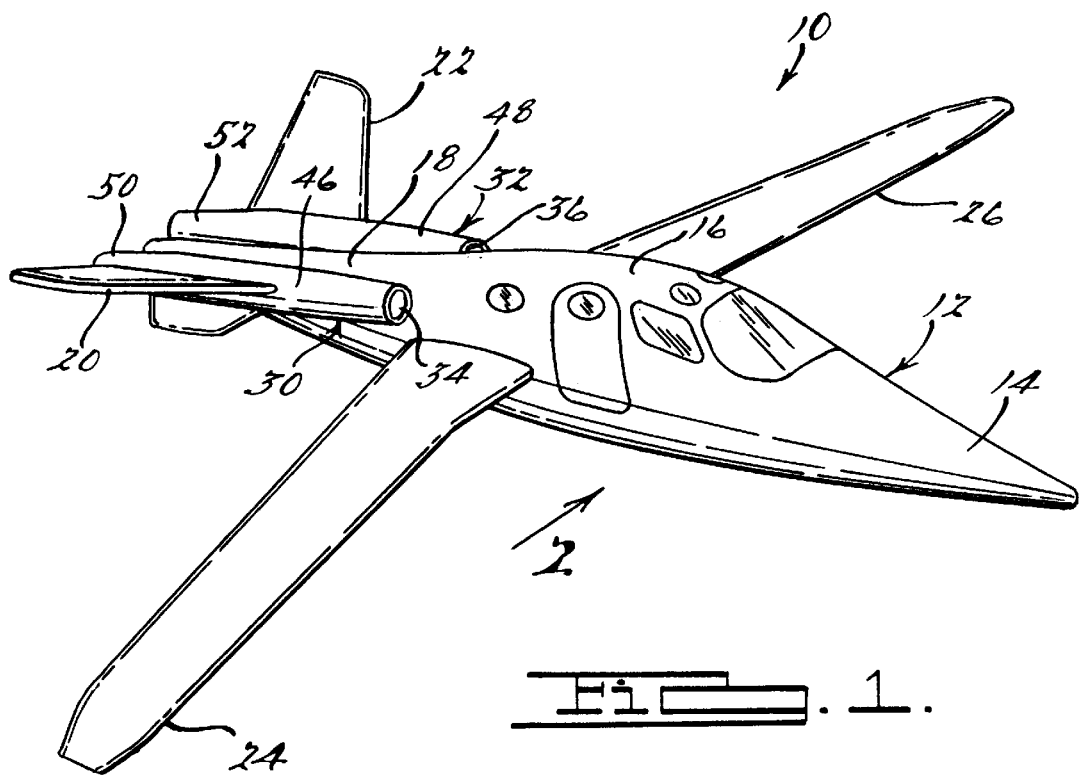
FIG. 1. is a perspective view of an aircraft in accordance with a preferred embodiment of the present invention.
Figure 2:
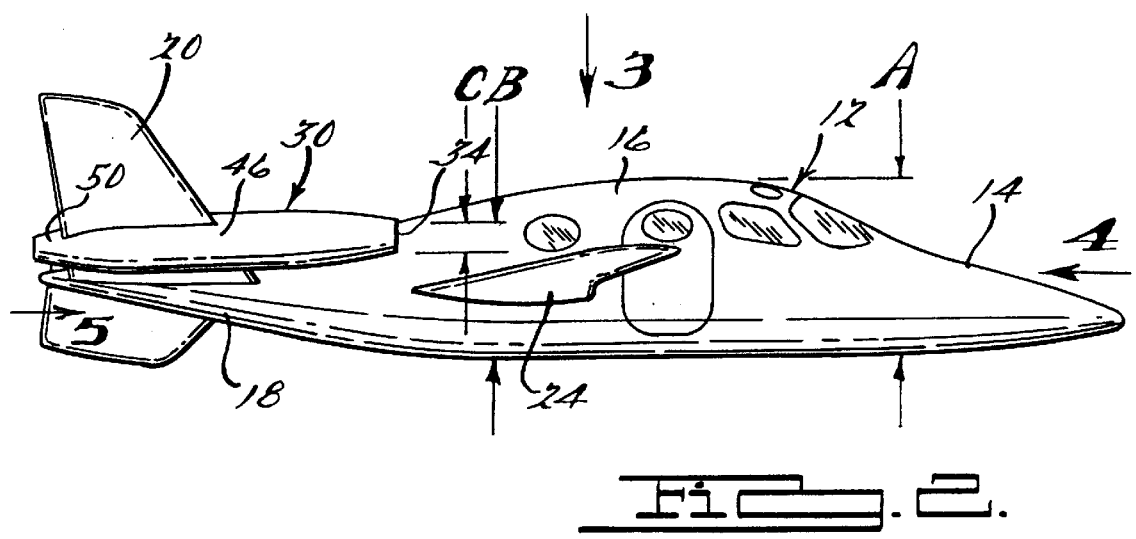
FIG. 2. is a side elevational view of the aircraft of FIG. 1.

As seen in FIGS. 1–5., a twin engine jet aircraft 10, comprises a fuselage 12 having a generally conical nose section 14, a generally cylindrical center section 16, of maximum lateral dimension (A), and a generally conical aft fuselage section or tail cone 18 of maximum lateral dimension (B). The aircraft 10 has combination vertical and horizontal stabilizers 20 and 22 disposed in a V-shaped array. Forwardly swept wings 24 and 26 are joined to the fuselage 12 at the aft end of the center section 16 thereof.

In accordance with the present invention, a pair of jet engines 30 and 32 are mounted on the stabilizers 20 and 22 respectively, in spaced relation to the aft fuselage section 18. The engines 30 and 32 have air inlets 34 and 36, respectively, with a maximum lateral dimension (C). The air inlets 34 and 36 are disposed entirely within a rearward projection of the dimension (A) of the cylindrical center portion 16 of the fuselage 12. The aforesaid dimensional relationship is made possible by minimizing the dimension (B) of the aft fuselage section 18 in the equation $(A) \geq (B) + (C)$.

Figure 3:
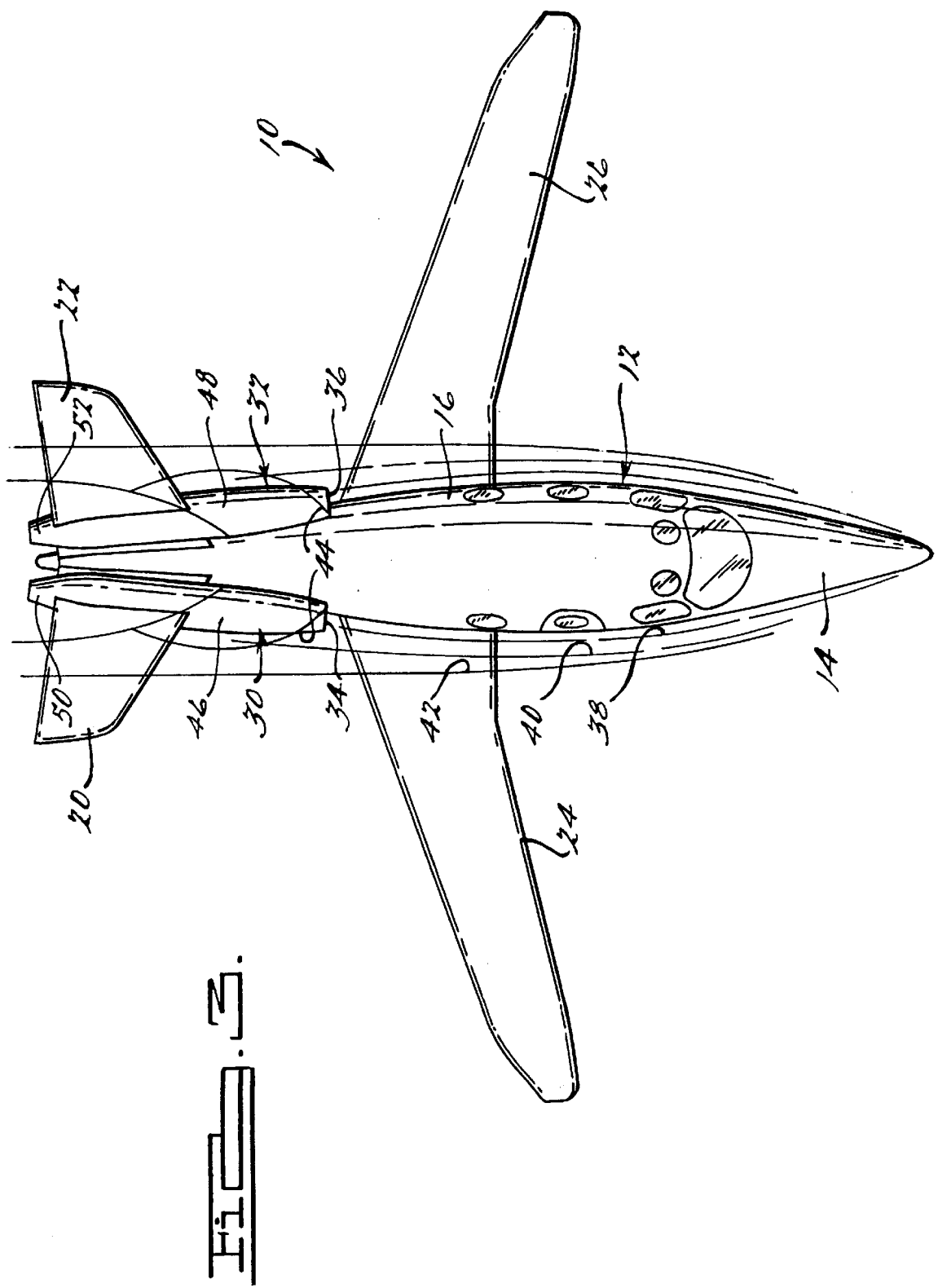
FIG. 3. is a top plan view of the aircraft of FIG. 2.

As best seen in FIG. 3, air flow in the boundary layer along the fuselage 12 of the aircraft 10 comprises laminar flow layers 38 and 40 and an external stream 42. The laminar flow layers 38 and 40 transition to a turbulent zone 44 thence to a wake 46.

Engine combustion air flowing in the laminar flow layers 38 and 40 enters the air inlets 34 and 36 forwardly of the transition line between the laminar layers 38–40 and turbulent zone 44. However, the inertia of heavy objects forced into the external air stream by the center section 16 of the fuselage 12 will preclude ingestion thereof into the engine air inlets 34 and 36.

It is to be noted that the air inlets 34 and 36 on the nacelles 46 and 48 of the engines 30 and 32 are cantilevered forwardly from the airfoil-shaped tail surfaces 20 and 22, respectively, with clearance provided between the engine nacelles 46 and 48 and the aft fuselage section 18 to allow boundary layer air to flow through this space. The nacelles 46 and 48 of the engines 30 and 32 encompass both sides of each tail surface 20 and 22 and taper at the rear to define engine exhaust jet nozzles 50 and 52 respectively.

While the preferred embodiment of the invention has been disclosed, it should be appreciated that the invention is susceptible of modification without departing from the scope of the following claims.

I claim:

1. A jet aircraft comprising:

a generally conical forward fuselage section;

a generally cylindrical intermediate fuselage section defining a passenger compartment;

a generally conical aft fuselage section having a maximum lateral dimension substantially smaller than the maximum lateral dimension of said intermediate fuselage section;

a pair of combination vertical and horizontal stabilizers extending laterally from said aft fuselage section in a V-shaped array; and a pair of propulsion engines mounted on said stabilizers, respectively, in spaced relation to said aft fuselage section, said engines having air inlets, nacelles and exhaust nozzles, respectively, disposed entirely within a rearward projection of a lateral cross section of said intermediate fuselage section.

2. The aircraft of claim 1 wherein the air inlets of said engines extend forwardly to a point immediately aft of the intermediate fuselage section of the aircraft and said exhaust nozzles extend aft of said stabilizers, respectively.

3. The aircraft of claim 2 wherein the nacelles of said engines extend rearwardly of said stabilizers on opposite sides thereof, respectively.

4. A jet aircraft comprising:

a generally conical forward fuselage section;

a generally cylindrical intermediate fuselage section defining a passenger compartment;

a generally conical aft fuselage section;

a pair of forwardly swept wings attached to the intermediate section of the fuselage adjacent the aft end thereof;

a pair of combination vertical and horizontal stabilizers extending laterally from said aft fuselage section in a V-shaped array; and a pair of propulsion engines mounted on said stabilizers, respectively, having air inlets lying within a rearward projection of a cross section of said intermediate fuselage section and closely spaced rearwardly from the rearwardmost point of attachment of said swept wings to fuselage.

\* \* \* \* \*